March 9, 1943.  G. O. BROWN ET AL  2,313,318
FRUIT JUICE EXTRACTOR
Filed Aug. 2, 1940  3 Sheets-Sheet 3
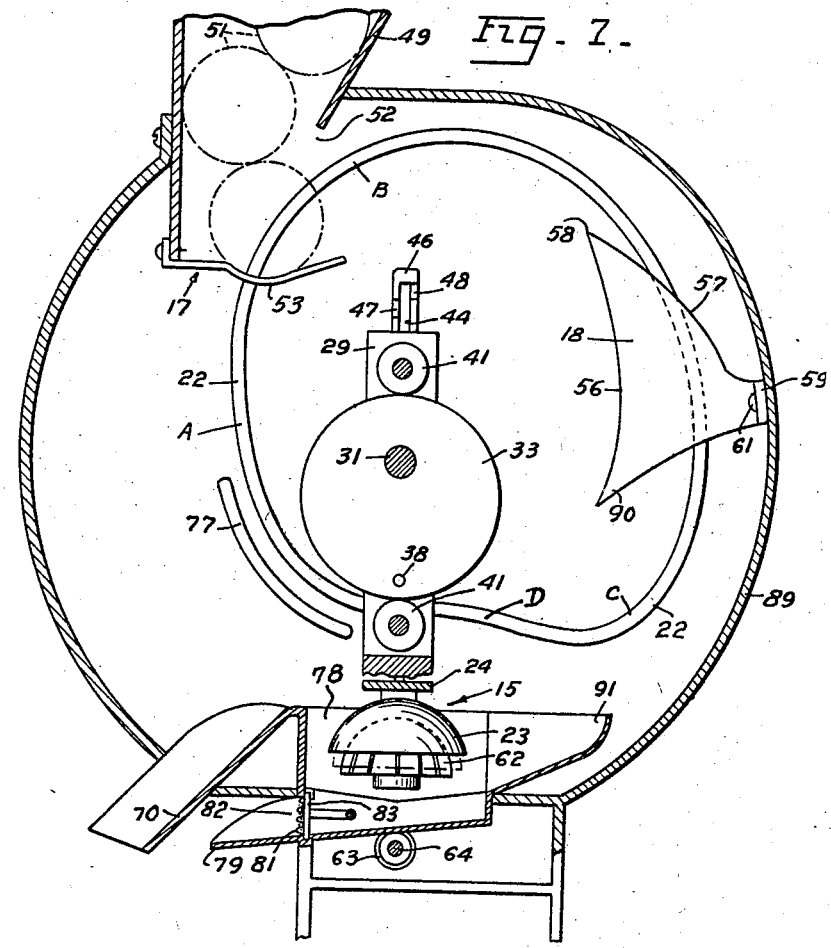
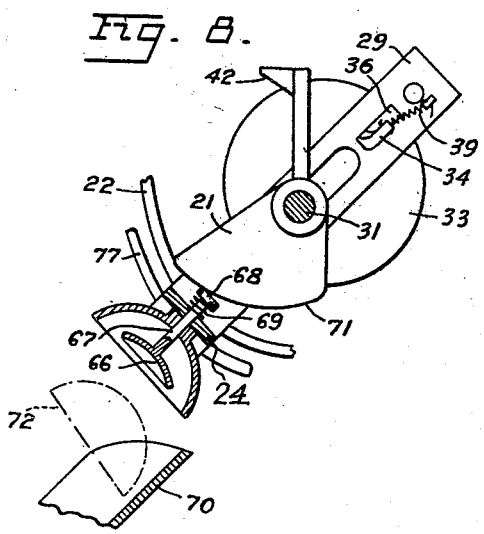
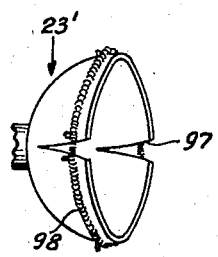
INVENTOR.
GUSTAVE O. BROWN
ALEXANDER VINOGRADOFF
BY George B. White
ATTORNEY.

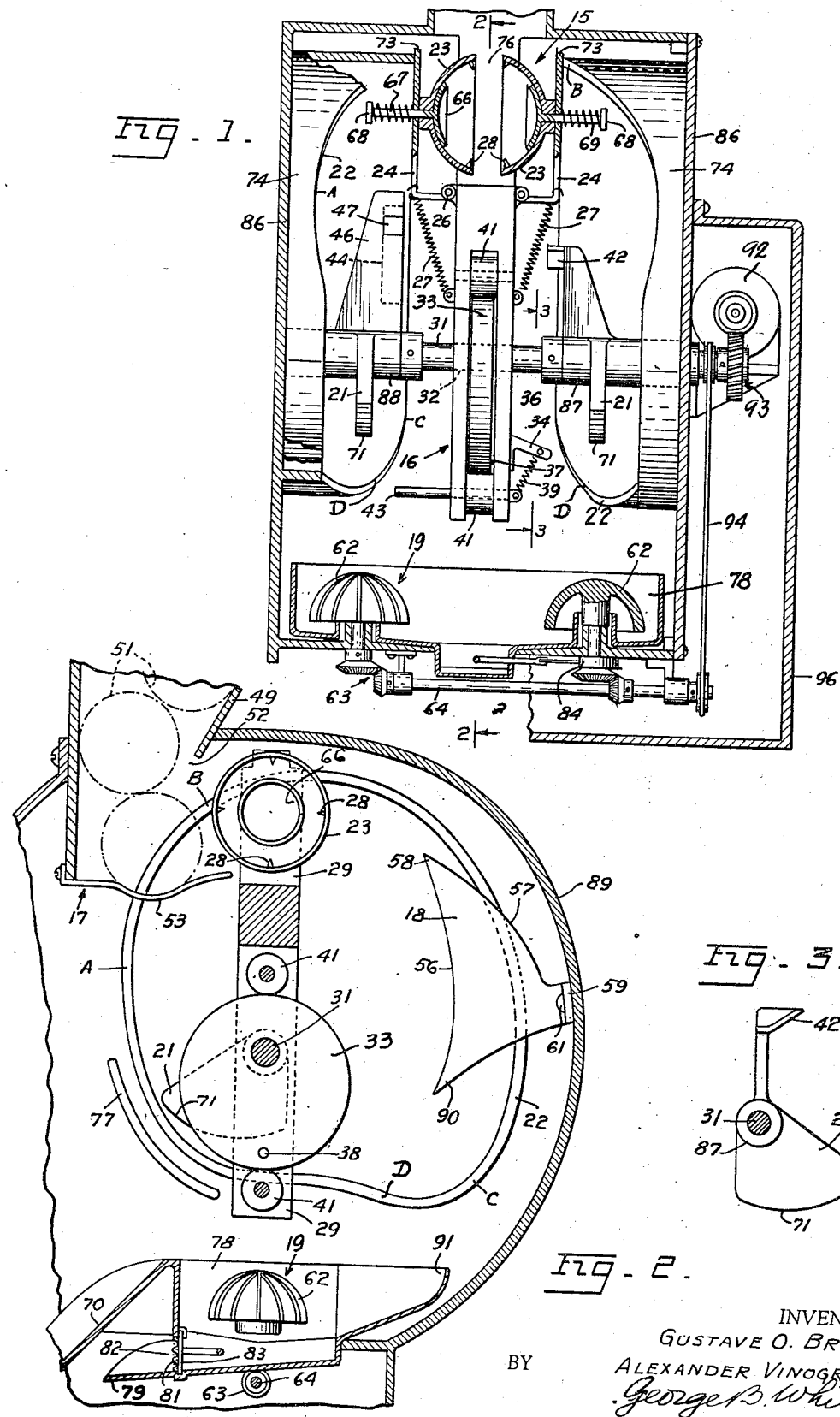

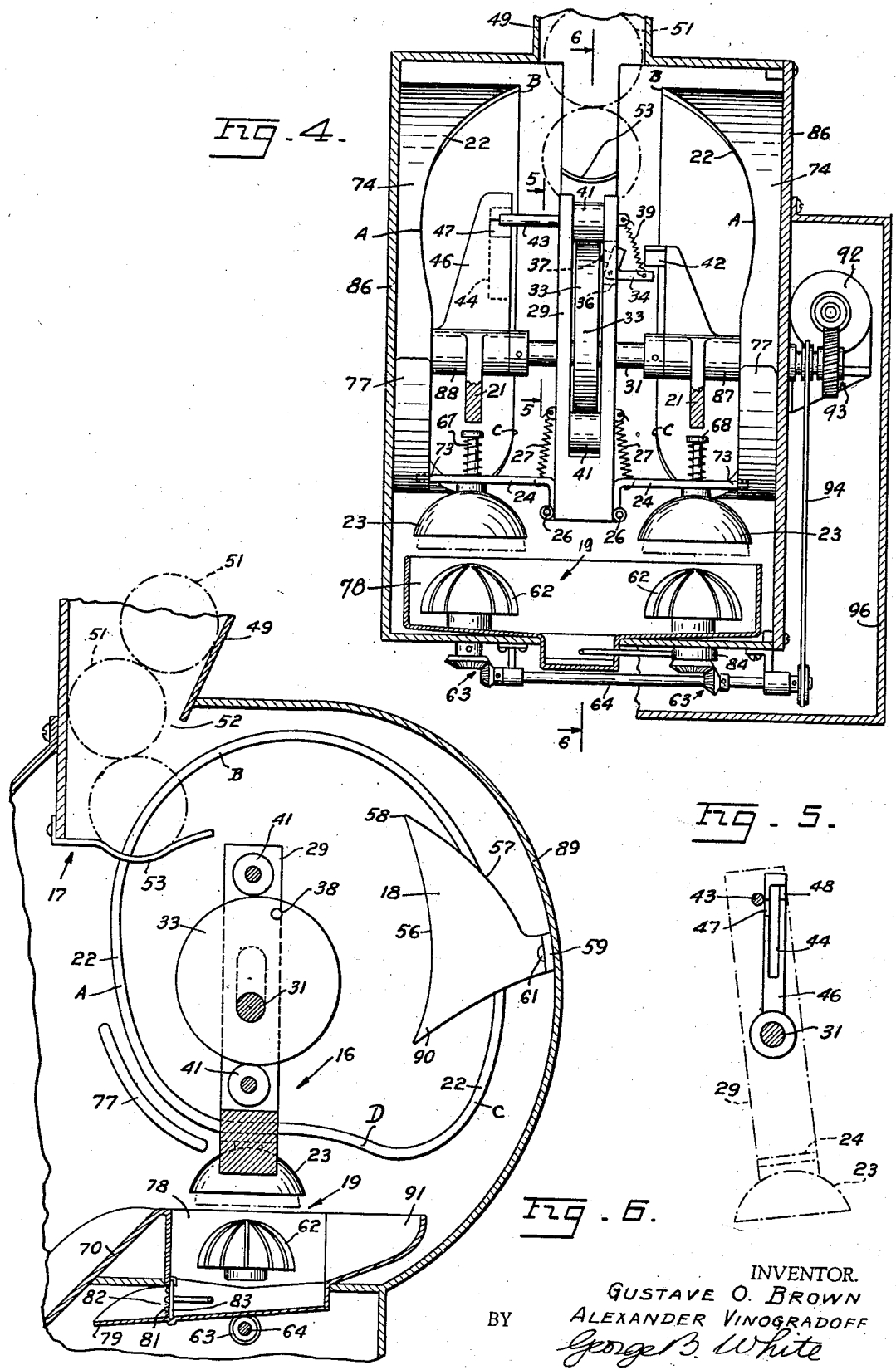

Patented Mar. 9, 1943

2,313,318

UNITED STATES PATENT OFFICE 2,313,318

FRUIT JUICE EXTRACTOR

Gustave O. Brown and Alexander Vinogradoff, San Francisco, Calif.

Application August 2, 1940, Serial No. 349,560

14 Claims. (Cl. 146—3)

This invention relates to a fruit juice extractor.

An object of this invention is to provide an apparatus for automatically cutting the fruit, such as a citrus fruit, and then extracting the juice from the cut pieces of the fruit in one continuous operation; the apparatus providing for the automatic loading of the apparatus which carries the fruit through the steps of its treatment until the fruit juice is effectively extracted.

Another object of this invention is to provide an apparatus wherein the fruit, such as a citrus fruit, is automatically engaged and carried over a knife to be cut at a predetermined angle and then the cut portions of the fruit are carried to an extracting mechanism for the extraction of all the juice from said pieces of the fruit, and wherein this operation is repeated automatically until the apparatus is stopped.

Particularly it is an object of this invention to provide a carrier for the fruit holders of a fruit extracting machine which rotates so as to carry the holders to a loading point where a fruit is picked up in the holders, and then carry the loaded holders over a knife in the path of the rotary movement so as to cut the fruit in the holders, and then convert the rotary motion at an extracting point to a predetermined reciprocating motion for subjecting the cut fruit pieces in the holders to the action of a juice extractor, and then resuming the rotation of the carrier to carry said holders back to said loading position, means being provided to adjust the relative positions of the fruit holders for the various steps of loading, cutting and extracting during the continuous movement of the apparatus.

A further object of this invention is to provide a carrying mechanism for the fruit holders of a fruit extractor which utilizes rotating drive to carry the holders around a substantially circular path from a loading position through a cutting position and to an extracting position, and from the extracting position back to the loading position, but converting said rotary movement into reciprocating movement at about said extracting position, means being provided for continually adjusting the holder positions for the loading, cutting and extracting operations as the holders are carried to said respective positions.

Another object of this invention is to provide a fruit extractor apparatus in which the fruit can be handled entirely within an inclosure in a continuous operation and within a limited space; the driving of the apparatus being adapted for automatic control or coin control.

Another object of this invention is to provide a fruit juice extractor which is highly useful and simple in construction. Convenience of arrangement, lightness and comparative inexpense of manufacture are further objects which have been borne in mind in the production and development of the invention.

We are aware that some changes may be made in the general arrangements and combinations of the several devices and parts, as well as in the details of the construction thereof without departing from the scope of the present invention as set forth in the following specification, and as defined in the following claims; hence we do not limit our invention to the exact arrangements and combinations of the said device and parts as described in the said specification, nor do we confine ourselves to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 1 is a partly sectional front view of the apparatus showing the holders just past the loading position.

Fig. 2 is a fragmental, partly sectional side view of the apparatus, the section being taken on about the lines 2—2 of Fig. 1.

Fig. 3 is a detail view of the ejector cam member and the drive shaft, the section being taken on the line 3—3 of Fig. 1.

Fig. 4 is a partly sectional front view of the apparatus showing the holders during the extraction stroke.

Fig. 5 is a sectional detail view of the reciprocating guide for the carrier the section being taken on the lines 5—5 of Fig. 4.

Fig. 6 is a partly sectional side view of the apparatus in said extracting position, the section being taken on about the lines 6—6 of Fig. 4.

Fig. 7 is a partly sectional side view of the apparatus showing the holders engaged with the reamers.

Fig. 8 is a partly sectional fragmental detail view of the apparatus showing the action of the ejection mechanism, and Fig. 9 is a perspective, detail view of a resiliently yieldable cup holder for the apparatus.

In its general organization this apparatus includes a pair of fruit holding units 15, carried by a carrier mechanism 16 past a feeding or loading element 17 so as to pick up a fruit, then over a knife 18 for cutting the fruit, then to an extracting or reamer mechanism 19 for extracting the juice from the fruit, then past an ejector actuator 21 for ejecting the peel or rind of the fruit, and then back to the loading element 17 for receiving another fruit. The mounting of the fruit holding units 15 on the carrier mechanism 16 is such that the relative positions of the holding units 15 during each cycle of the operation are controlled and automatically adjusted to suit the respective operations in the herein illustration. The adjustment of the relative positions of the units 15 is performed with the aid of cam surfaces 22.

Each holding unit 15 in the herein illustration includes a substantially semispherical cup 23 secured on a lever arm 24, which latter is bent at an angle and is fulcrumed at its bent end 26 to the carrier mechanism 16 so that the opposed cups 23 are swingable from a position facing each other as shown in Fig. 1, into a position facing in the same plane as shown in Fig. 4, and vice versa. A spring 27 secured at one end to the carrier mechanism 16 and at its other end to the lever arm 24 normally urges each cup 23 away from said facing position. Each cup 23 has a plurality of sharp prongs 28 extended from its inner periphery for engagement with the fruit to be handled. It is to be noted that while the apparatus may be used in connection with fruits of various types, the embodiment herein illustrated is particularly adapted for handling citrus fruit, such as oranges.

The carrier mechanism 17 includes a bifurcated frame 29. The lever arm fulcrums 26 of the holder units 16 are located on opposite sides of the solid portion of the frame 29. A rotary drive shaft 31 rotatably extends through holes 32 in the legs of the frame 29. On the shaft 31 is fixedly secured an eccentric disc 33 between the legs of the frame 29. The eccentric disc 33 and the frame 29 are releasably connected to each other by a bell crank catch 34 which latter is journaled in one of the legs of the frame 29. One arm of the bell crank catch 34 projects outwardly from the frame 29 and its other arm is movable in a slot 36 toward the eccentric disc 33. The last mentioned or inner arm of the bell crank catch has a catch pin 37 on it which is engaged with a hole 38 in the face of the eccentric disc 33. A spring 39 is connected at one end to the frame 29 and at its other end to the outer arm of the catch 34 and it normally urges the catch 34 and the catch pin 37 toward engagement with the disc 33. Whenever the catch 34 is engaged with the eccentric disc 33 the frame 29 rotates with the drive shaft 31 as a unit. Whenever the catch 34 is released from the eccentric disc 33 the frame 29 is reciprocated by reason of the eccentric throw of the disc 33. This reciprocating movement is aided by a pair of spaced rollers 41 secured in the frame 29 and engaging the periphery of the eccentric disc 33 at diametrically opposite points, so as to ride on the disc periphery when the catch 34 is disengaged. This reduces friction and converts the rotation of the eccentric disc 33 into reciprocation of the frame 29 whenever the catch 34 is released. To correctly synchronize the reciprocating movement of the frame 29 a release abutment 42 is located in the path of the outer arm of the catch 34 so as to trip and release the catch 34 just about when the cups 23 are opposite the extracting or reamer mechanism 19. For this purpose the catch 34 is located at about 180° relatively to the position of the holder units 15 on the frame 29 and the release abutment 42 is located at a point slightly in advance of a point diametrically opposite to the location of the extracting or reamer mechanism 19. Thus when the holding units 15 approach the extracting mechanism 19 at about the angular position shown in Fig. 5 the outer lever arm of the catch 34 is tripped by the underside of the release abutment 42. This abutment 42 inclines downwardly toward the direction of rotation of the frame 29, and thereby forces the outer arm of the catch 34 downwardly so as to pull the catch pin 37 out of the eccentric disc 33 and thereby disengage the frame 29.

The frame 29 is prevented from turning with the eccentric disc 33 and is guided in its reciprocating strokes toward and away from the extracting mechanism 19 by a guide pin 43 extended from the frame 29 in a direction and on a side opposite to the catch 34, but near the same end of said frame. This guide pin 43 coacts with a vertical guide slot 44 in the edge of a guide bracket 46 which latter is located substantially opposite to the location of the release abutment 42. The guide slot 44 has a side inlet aperture 47 which is located on the side of the guide bracket 46 facing in the direction from which the guide pin 43 approaches as the frame 29 is rotated. The inlet aperture 47 is preferably so located as to be slightly beneath the guide pin position at the moment when the catch 34 is released, so that the guide pin 43 is entered through said inlet aperture just when the reciprocating movement of the frame 29 begins. The momentum of the frame 29 helps the entry of the guide pin 43 into the guide slot 44. The function of the guide pin 43 in said slot 44 is to hold the frame 29 in true alignment with the extracting or reamer mechanism 19 during said reciprocating movement. It is to be noted that at the moment of the tripping of the catch 34 the rotation of the eccentric disc 33 with the drive shaft 31 shifts the catch hole 38 out of the alignment with the catch pin 37 so that although the catch 34 is freed from the abutment 42 by the time the frame 29 is in its reciprocating position, yet the catch pin 37 cannot re-enter the hole 38 until a complete revolution of the eccentric disc 33 returns the hole 38 into its aligning position opposite the catch pin 37. During this complete revolution of the eccentric disc 33 the frame 29 completes its reciprocating movement to and from the extracting mechanism 19. At the end of the return stroke of the frame 29 the guide pin 43 is opposite to an exit aperture 48 of the guide slot 44 so that as the frame 29 and the disc 33 are again interlocked and begin to rotate together, the guide pin 43 is permitted to leave the guide slot 44. The outlet aperture 48 of the guide slot 44 is slightly offset above the location of the inlet aperture 47 so as to obviate the passing of the guide pin 43 through said apertures directly, and to hold the pin 43 in the slot 44 for the duration of the reciprocation of the frame 29 during the juice extracting operation.

The feeding or loading element 17 may be of any suitable mechanism for advancing and holding a fruit in position to be engaged by the cups 23 as they are carried past said element 17. It is to be noted that the cups 23 are held apart far enough to pass over the periphery of the fruit held in the loading element 17 and the cam surfaces 22 are caused to act to clamp the cups 23 unto the fruit. For instance in the present illustration the apparatus is used for extracting orange juice from oranges. The orange 51 as shown in broken lines in Figures 2, 4, 6 and 7, is held in a suitable hopper 49 at the top of the apparatus. Below the feed opening 52 of the hopper 49 is a dished platform 53 within which the orange 51 is held stationary. This platform 53 is narrower than the usual diameter of the orange used in said apparatus so as to allow the parted cups 23 to pass over the platform 53 for picking up the orange 51. A lip of the dished platform 53 is so curved as to guide the orange 51 at the beginning of its movement with the cups 23. The dished platform 53 is offset to one side of the vertical relatively to the center of rotation of the carrier mechanism 16 so that the cups 23 travel over said platform 53 on an arcuate upward path. This permits the extension of the lip 54 slightly upwardly thereby to provide a retainer lip for holding the oranges from rolling off the platform 53.

The knife 18 is located in the path of the rotating travel of the cups 23 between the loading element 17 and the extracting mechanism 19 so as to extend above the level of the axis of rotation of the carrier mechanism 16. The knife 18 has a curved cutting edge 56 facing toward the carrier mechanism 16 and another cutting edge 57 in the same plane converging toward the first cutting edge 56 oppositely to the direction of rotary movement of the holder units 15 so as to form a piercing point 58 pointing substantially to the middle of the orange 49 when the orange is carried against the knife 18 by said holding unit 15. The inner blade or knife edge 56 curves inwardly toward the carrier to below the level of the center of rotation sufficiently far to cut through the entire periphery of the orange 51 nearer the center of rotation. The outer cutting edge 57 flares away at such an angle outwardly as to accommodate the outermost periphery of the orange 51 carried over said knife 18. In other words the cutting edges 56 and 57 diverge from said piercing point 58 so that the width of the knife where the orange leaves it is wider than the normal diameter of the largest orange to be used in said extractor. The curvatures of the cutting edges 56 and 57 of the knife 18 are eccentric relatively to the center of rotation of the carrier 16, namely the inner cutting edge 56 curves toward the center from the piercing point 58 while the outer cutting edge 57 curves from said piercing point 58 outwardly and away from the center of rotation. This particular shape of the knife causes efficient shearing action for cutting the orange through the plane between the cups 23. The plane of the knife is aligned with the space between the cups 23. The knife 18 is secured in a suitable manner to the housing of the apparatus so as to be held stationary relatively to the carrier mechanism 16, such as by means of a flange 59 and screw 61, or the like.

The extracting mechanism 19 may be of any suitable type. In this illustration we provide a pair of spaced reamers 62 of the usual type. The spacing between the reamers 62 is the same as the distance between the cups 23 when held side by side in the same plane is shown in Fig. 4. The reamers may be stationary or rotating. In this illustration rotation is transmitted to said reamers 62 by suitable gear transmissions 63, from a shaft 64. The reamers 62 are located at the bottom of the apparatus substantially symmetrically relatively to a vertical line through center of rotation.

The ejector actuator 21 is a cam fixedly held for engagement with the ejector mechanism of the holder units 15 at a point between the reamer mechanism 19 and the loading element 17. The ejector mechanism of each holder unit 15 consists of an ejector plate 66 in the bottom of each cup 23. A stem 67 slidably extends through the bottom of each cup 23. The stem 67 has a head 68 on its outside end. A coil spring 69 around stem 67 bears against the outside of the bottom of the cup 23 and against the stem head 68 so as to urge the stem 67 outwardly and thereby to draw the ejector plate 66 against the bottom of the cup 23. The ejector plate 66 is dished to accommodate the curvature of the cup 23 and of the fruit handled. The ejector actuator 21 is so located in the path of the ejector head 68 that the ejector head 68 rides against the eccentric cam surface 71 of the actuator 21 and is depressed thereby against the action of the spring 69 so as to push the ejector plate 66 away from the cup bottom and toward the mouth of the cup 23 for pushing the rind of the citrus fruit or orange out of the cup 23. The ejector action is illustrated in Fig. 8 showing the relative positions of parts of the apparatus. A discharge chute 70 is located below the point of ejection for receiving the ejected rind shown at 72 in Fig. 8.

During the repeated successive operations of loading the orange into the cups 23, then cutting the oranges, then forcing the cut halves of the oranges against the reamers 12, and finally ejecting the rind, the cups 23 must assume certain positions and relations to subject the orange to the respective operations. The positions of the cups 23 are automatically adjusted by the coaction of the outer ends 73 of the lever arms 24 on which the cups 23 are supported. These lever ends 73 are urged outwardly, away from the frame 29 by the springs 27 and the same outward pressure holds these lever ends 73 against the guide surfaces 22. There is a continuous guide surface 22 on each side of the frame 29 formed on symmetrical flanges 74 projecting from the housing of the apparatus oppositely to each other and toward the opposite sides of the frame 29. The distance of each guide surface 22 from the center line of the frame 29 varies according to the width of the guide flange 74. This distance is predetermined so as to move the lever arms 24 of the cups 23 in opposite directions according to the spacing or cup position desired. At about the portion A of the guide surface 22 the flange 74 is sufficiently narrow to hold the cups 23 apart allowing them to move over the periphery of the fruit 51 on the loading platform 53. This portion of the path or guide surface 22 between the point marked A and the loading platform 53 however gradually heightens, the flange 74 being gradually widened, so as to force the cups 23 toward each other. At the point opposite the position of the fruit 51 on the platform 53 the guide surface 22 is high enough to cause the penetration of the sharp prongs 28 into the orange 51. Thus the cups begin to carry the orange off the loading platform 53. The flange is the widest near the topmost position at about B where the cups 23 are fully clamped onto the orange 51. It is to be noted that the guide surface 22 is such that it never forces the cups 23 into face to face contact. There is always left an annular space 76 between the cups 23 in said clamping position. This space 76 is in a central plane and the knife 18 is aligned with it for cutting through the middle of the orange 51. The guide surface 22 is in the same vertical plane, namely at the same level, through the entire distances to about the point marked C below the knife 18. Beginning at the point C in approaching the extracting position the flange 74 gradually narrows until at about the points marked D the flange is so narrow that the springs 27 move the lever arms 24 to horizontally aligned positions in one plane as shown in Fig. 4. The cups are in this spread position during the aforedescribed reciprocating operation to and from the reamers 12. The guide surface 22 remains flat until the cups 23 pass the ejector actuator 21. During the ejecting operation it is necessary that the cups 23 be prevented to yield to the force exerted by the actuator 21 on the ejector head 68. For this purpose a short parallel guide flange 77 is provided below each guide flange 74 radially opposite to the ejector actuator 21. The flatly riding lever arms 24 are confined between the parallel flanges 74 and 77 during the rind ejection and are prevented from being folded by the ejecting force of the ejector parts of the cups 23. In this manner the position of the cups 23 throughout the cycle of operations in the apparatus is automatically determined so as to hold the fruit in the proper position for the various operations.

Under and around the reamers 62 is a suitable pan 78 which receives the extracted juice, collects it and dispenses it through a suitable spout 79. A screen 81 is extended across the spout opening 82 for straining the fruit juice. The pulp and other substance collected on the screen 81 is cleaned by a reciprocating scraper 83 which is operated by an eccentric mechanism 84 from one of the reamer drives or transmissions 63. During the operation of the reamers 62 the scraper 83 agitates and scrapes the screen 81 to assure flow of the juice from the apparatus.

The entire apparatus is included in a suitable housing which may be transparent if desired. The housing 86 herein shown compactly surrounds and protects the apparatus and it supports the stationary parts of the apparatus in their respective relative positions.

The hopper 49 is supported in the top of the housing 86 and the platform 53 is supported on the discharge side of the hopper 49. The guide flanges 74 and 77 are supported on the inside faces of the sides of the housing 86. Suitable bearing brackets 87 and 88 also extend from the sides of the housing 86 and the drive shaft 31 is rotatably supported in said brackets 87 and 88. The ejector actuators 21 extend parallel from the respective bearing brackets 87 and 88. The catch release abutment 42 extends upwardly from the bracket 87 near one side of the frame 29. The guide bracket 46 for the guide slot 44 extends upwardly from the bearing bracket 88 near the opposite side of the frame 29. The reamer mechanism 19 is mounted on the bottom of the housing 86. The knife 18 is mounted on the curved wall 89 of the housing so that the lower edge and corner 90 of the knife 18 is projected to incline and drip downwardly and into an extension 91 of the pan 78, thereby collecting all the juice that may escape during the cutting of the fruit.

In the herein illustration the drive shaft 31 is driven by a motor 92 through a suitable gearing 93. A transmission, such as a pulley and chain or belt transmission 94 transmits power from the drive shaft 31 to the reamer driving shaft 64 which latter is journaled beneath and outside the drain pan 78. A removable housing 95 incloses the transmissions and drives so that all moving parts are inclosed.

In operation the oranges drop down one by one from the hopper 49 into the platform 53 and rest there until picked up by the cups 23. Upon rotation of the drive shaft 31 the cups 23 are brought to the platform 53. The flanges 74 and guide surfaces 22 clamp the cups 23 over the orange or citrus fruit on the platform 53. The cups 23 are held in clamping position while they carry the orange over the knife 18 so as to cut the orange into halves. Then the guide surfaces 22 cause the parting of the cups 23 into the horizontal level positions to register the cups 23 and the half oranges in them with the reamers 62. During the previous operation the shaft 31, the eccentric disc 33 and the frame 29 rotated as a unit. At about the time when the cups 23 are separated and approach the location above the reamers 62, the outer arm of the catch 34 rides against the under side of the release abutment 42 and is tripped thereby so as to disconnect from the disc 33. At about the same time the guide pin 43 on the other side of the frame 29 abuts against the guide bracket 46 and then enters the guide slot 44. The disconnected frame 29 is reciprocated by the eccentric disc 33 so as to move the spread cups 23 against the reamers 62 and then back to normal position. At the completion of these strokes the disc hole 32 is aligned again with the catch 34 and the guide pin 43 is at the exit aperture 48 of the slot 44 so that the disc 33 and frame 29 again rotate as unit. The cups are then carried past the ejector actuator 21 and the rind is ejected as heretofore described. Then the cups 23 are again guided to clamping position and the cycle of operation is repeated.

While in the herein description of the operation of the apparatus reference is had to oranges and to extracting orange juice it is to be understood that the apparatus may be used with various citrus fruit and other fruits. There is frequently a limited difference in size of roundness of fruits within the range of a grade used. The prongs 28 in the cups 23 allow for a certain range of variation. The modified embodiment of the cup shown in Fig. 9 illustrates another method for allowing for slight differences in the sizes and shapes of the fruit handled. In this modified form the cup 23' has a pair of diametrically opposite wedge shaped slots 97 cut thereinto. This cup 23' is preferably made of sufficiently resilient material to allow limited expansion. A coil spring band 98 surrounds the cup 23' so as to urge the split portions of the cup 23' together.

It will be recognized that the apparatus herein efficiently and quickly extracts fruit juice. The device operates continuously while the shaft 31 is rotated. The shaft 31 may be rotated manually, mechanically, and the device is adapted for coin control operation by regulating the rotation of the shaft 31 with a usual coin control mechanism. The device does not require any adjustment or setting up for each operation, because once adjusted it automatically picks up the fruit one by one, cuts the fruit, extracts and drains the juice, and discards the rind through a continuous cycle of operation efficiently within a compact unit.

We claim:

1. In a fruit juice extractor a pair of separable holders for holding a fruit therebetween, means to carry the holders together on the same circular path, a knife held in the circular path, said pair of holders being parallel to the axis of said circular path and being so spaced from each other outwardly axially of the circular path and on each side thereof that the space therebetween passes past said knife so as to carry the fruit over said knife for cutting the same, a pair of spaced reamers held substantially parallel with a radius of said circular path at a point past said knife in the direction of the circular movement of said holders, means to turn said holders away from each other and to positions substantially at right angles to said axis and spaced positions corresponding to the spacing of the reamers from each other and toward said reamers, means to reciprocate the separated pair of holders and the halves of cut fruit therein substantially at right angles to said axis of said circular path toward said reamers and to hold said holders and fruit against the respective reamers for a predetermined period, means to eject the reamed fruit parts from the separated holders past said reamers on said circular path, and means to turn said holders to opposed position for gripping a whole fruit for the next cycle of operation.

2. In a juice extracting device of the character described, a stationary cutter, a rotating carrier to carry a fruit over said cutter so as to cut said fruit, said cutter comprising a substantially triangular blade parallel with the plane of rotation of said carrier, cutting edges of said blade converging to a cutting corner forming one apex of the triangle in the circular path of movement of the fruit and toward the direction from which the fruit is carried to the cutter, said cutting edges being so curved as to be concave toward the axis of rotation of said carrier and to diverge, substantially in the direction of rotation to a distance wider than the usual width of the fruit carried in said device, and a draining edge on said knife extending between the cutting edges and projecting downwardly and toward said axis of rotation to form a corner for collecting and dripping juice from the knife at a lower apex of the triangular blade, the third apex of said blade forming the support of the blade outside of the circular path of movement of the fruit carried by said carrier.

3. In a fruit juice extractor device, a housing, a rotating carrier in the housing, loading means near the top of the housing, reamers at the bottom of the housing, a cutting member between the loading means and the reamers so as to be in the path of the carrier movement toward said reamers, holders on the carrier movable apart from each other, means on the housing to guide said holders in fruit gripping position from the loading through said cutting means and to move them apart so as to turn them at right angles to their previous gripping positions with respect to the axis of rotation of said carrier into alignment with said reamers after the fruit was cut, means to convert the rotation of the carrier into reciprocation of the carrier toward and away from said reamers for extracting the juice, said holder guiding means being adapted to turn and close said holders toward each other and over a fruit at said loading means and into a clamping position, and means to collect the extracted juice.

4. In a fruit juice extracting device the combination with a rotating carrier for the fruit holders, cutting means in the path of rotation reamers, and means to spread and align said fruit holders with said reamers after the fruit is cut, of a drive shaft, an eccentric on the drive shaft, a support forming said carrier and being supported on the eccentric, a releasable catch to connect said support to said eccentric for rotation as a unit, tripping means to disengage said catch when the support is in a position to hold said holders opposite said reamers so as to permit reciprocation of said support by said eccentric, and means to hold said support against rotation during said reciprocation.

5. In a fruit juice extractor, the combination with a knife and the reamers, of separable holders facing toward each other substantially parallel to the axis of a circular path for engaging the fruit, a carrier for carrying said holders on said circular path, means to hold said holders in fruit engaging position during their travel with the fruit past the knife for cutting the fruit, means to move said holders apart and from the position parallel to the axis of said circular path to a position substantially vertical to such axis so as to face each separated holder toward one of said reamers, and means to reciprocate said holders in said vertical directions so as to engage said cut fruit with said reamers and to return said holders away from said reamers.

6. In a fruit juice extractor, the combination with a knife and reamers; of a pair of separable holders adapted to engage opposite sides of the fruit, a carrier for said holders, means of connection between said carrier and the holders to allow change of position of said holders relatively to each other, means to impart movement to said carrier on a substantially circular path so as to carry the holders and the fruit past the knife for cutting the fruit, means to convert said moving force into reciprocating movement radially to said circular path and toward and away from said reamers after said cutting, means to control the position of said holders so as to hold said holders spaced apart substantially parallel to the axis of the circular path and one holder on each side of the circular path but in gripping position to allow passage of the gripped fruit past the knife, means to turn the sections of the holders and the cut fruit therein from the position substantially parallel to the axis of the circular path to a position substantially vertical to such axis and to hold said turned sections of said holders aligned with said reamers during the said reciprocating movement and means to move said holders into gripping position over a fruit after said holders are carried away from said reamers.

7. In a fruit juice extractor, the combination with a knife and reamers; of a pair of opposed cup-like holders, means to carry said cups on a substantially circular path from a loading position past said knife and to said reamers and back to the loading position, means to control the position of said cups during a cycle of operation so as to grip the fruit and have the space between the cups aligned with the knife during the cutting in a position with the mouths of the cups substantially facing the plane of said circular path, and means to separate and turn the cups from said initial position to a position substantially vertical to the axis of said circular path and toward the reamers during reaming, and means to return the cups toward said position facing said circular path and toward each other so as to engage another fruit at the initial or loading position.

8. In a fruit juice extractor, the combination with a knife and reamers; of a pair of opposed cup-like holders, means to carry said cups on a substantially circular path from a loading position past said knife and to said reamers and back to the loading position, means to control the position of said cups during a cycle of operation so as to grip the fruit and have the space between the cups aligned with the knife during the cutting, to separate and turn the cups substantially at right angles to face in the same direction and toward the reamers during reaming and to return the cups to face each other so as to engage another fruit at the initial or loading position, said carrying means including a frame, means to adjustably connect said cups to the frame so as to hold the cups in a position facing substantially parallel with the axis of said circular path until the cups approach the reamers, means to turn and hold the cups facing substantially at right angles to such axis when approaching said reamers, a rotating drive element, releasable means to connect said frame to said drive element for rotation therewith until the cups reach a position substantially opposite to the reamers, and means actuated at the reamer position of the cups to temporarily release said connecting means and to convert the rotating movement of said drive element into a reciprocating movement of the frame and of the cups substantially at right angles to the axis of said circular path toward and away from said reamers.

9. In a fruit juice extractor, the combination with a knife and reamers; of a pair of opposed cup-like holders, means to carry said cups from a loading position past said knife and to said reamers and back to the loading position, means to control the position of said cups during a cycle of operation so as to grip the fruit and have the space between the cups aligned with the knife during the cutting, to separate and turn the cups apart and to face them so as to hold said cups facing toward each other substantially parallel with the plane of their movements from the loading to about the reaming positions, and to hold said cups facing substantially at right angles to the plane of said movement and toward the reamers during reaming and to return the cups toward each other so as to engage another fruit at the initial or loading position, said carrying means including a frame, means to adjustably connect said cups to the frame, a rotating drive element, releasable means to connect said frame to said drive element for rotation therewith until the cups reach a position substantially opposite to the reamers, and means actuated at the reamer position of the cups to temporarily release said connecting means and to convert the rotating movement of said drive element into a reciprocating movement of the frame and of the cups toward and away from said reamers substantially at right angles to the axis of rotation of said frame, and means between the reaming position and loading position of the path of cups for ejecting the rind of the fruit from the cups.

10. In a fruit juice extracting device, the combination with a loading means, a cutting blade arranged in the path of movement of the fruit, and reamer means arranged axially offset from the circumference of the path of the fruit in said device, of a carrier mechanism comprising a rotating drive element, a member movable on the rotating drive element, means of connection between said rotating drive element and said movable member to convert the rotation of said element into reciprocating motion of the movable member, means to interlock said movable member and said means of connection for rotation as a unit, adjustable holding means on said movable member for carrying the fruit to be cut from said loading means to the cutting blade and reamer means, means to turn said holding means toward the axially offset reamer means when said holding means is approaching the position of said reamer means, and means to temporarily release said movable member for said reciprocating movement when said holding means is aligned with said reamer means.

11. In a fruit juice extracting device, the combination with a loading means, a cutting blade, and reamer means arranged substantially circumferentially of the device, of a carrier mechanism comprising a rotating drive element, a member movable on the rotating drive element, means of connection between said rotating drive element and said movable member to convert the rotation of said element into reciprocating motion of the movable member, releasable means to interlock said movable member and said means of connection for rotation as a unit, adjustable holding means on said movable member for carrying the fruit to be cut from said loading means to the cutting blade and reamer means, and means to temporarily release said movable member for said reciprocating movement when said holding means is aligned with said reamer means, said holding means comprising a pair of spaced cup-like holders, yieldable connection between each holder and the movable carrier member normally urging the opposed holders apart from each other to face radially from the frame, and means engaged by said holders to regulate the relative positions of said holders so as to align them with said loading means, said cutting blade, and said reamer in predetermined spaced positions.

12. In a fruit extracting device of the character described, having loading means, cutting means, and juice extracting means, a fruit carrying mechanism comprising, a pair of opposed holders, a carrier for the holders, means to rotate said carrier, means to adjustably support the holders on said carrier, resilient means to urge the holders apart from each other to positions facing substantially radially with respect to the plane of rotation of the carrier, and guide means to adjust the positions of the holders relatively to each other as they are carried around by the carrier so as to align said holders to face each other and the fruit in operative relation to said loading means, and in spaced opposed relation at said cutting means and to face substantially radially at said juice extracting means, and means to convert said rotating movement of the carrier to reciprocating movement during the extraction operation at said juice extracting means.

13. In a fruit juice extracting device having a rotating carrier to carry the fruit around successively to a cutting blade and to extracting means, adjustable fruit holders comprising, a pair of opposed cup-like members, means to pivotally connect said members to said carrier so that said members are movable apart from each other from a position substantially parallel to the axis of rotation of said carrier to a position substantially at right angles to such axis, guides along the path of movement of the holders to regulate the relative positions of the respective opposed cup-like members so that said members are clamped on the fruit through the cutting operation and the members are apart and at cular path, a knife held in the circular path, said pair of holders being parallel to the axis of said circular path and being so spaced from each other outwardly axially of the circular path and on each side thereof that the space therebetween passes past said knife so as to carry the fruit over said knife for cutting the same, a pair of spaced reamers held substantially parallel with a radius of said circular path at a point past said knife in the direction of the circular movement of said holders, means to turn said holders away from each other and to positions substantially at right angles to said axis and spaced positions corresponding to the spacing of the reamers from each other and toward said reamers, means to reciprocate the separated pair of holders and the halves of cut fruit therein substantially at right angles to said axis of said circular path toward said reamers and to hold said holders and fruit against the respective reamers for a predetermined period, means to eject the reamed fruit parts from the separated holders past said reamers on said circular path, and means to turn said holders to opposed position for gripping a whole fruit for the next cycle of operation.

2. In a juice extracting device of the character described, a stationary cutter, a rotating carrier to carry a fruit over said cutter so as to cut said fruit, said cutter comprising a substantially triangular blade parallel with the plane of rotation of said carrier, cutting edges of said blade converging to a cutting corner forming one apex of the triangle in the circular path of movement of the fruit and toward the direction from which the fruit is carried to the cutter, said cutting edges being so curved as to be concave toward the axis of rotation of said carrier and to diverge, substantially in the direction of rotation to a distance wider than the usual width of the fruit carried in said device, and a draining edge on said knife extending between the cutting edges and projecting downwardly and toward said axis of rotation to form a corner for collecting and dripping juice from the knife at a lower apex of the triangular blade, the third apex of said blade forming the support of the blade outside of the circular path of movement of the fruit carried by said carrier.

3. In a fruit juice extractor device, a housing, a rotating carrier in the housing, loading means near the top of the housing, reamers at the bottom of the housing, a cutting member between the loading means and the reamers so as to be in the path of the carrier movement toward said reamers, holders on the carrier movable apart from each other, means on the housing to guide said holders in fruit gripping position from the loading through said cutting means and to move them apart so as to turn them at right angles to their previous gripping positions with respect to the axis of rotation of said carrier into alignment with said reamers after the fruit was cut, means to convert the rotation of the carrier into reciprocation of the carrier toward and away from said reamers for extracting the juice, said holder guiding means being adapted to turn and close said holders toward each other and over a fruit at said loading means and into a clamping position, and means to collect the extracted juice.

4. In a fruit juice extracting device the combination with a rotating carrier for the fruit holders, cutting means in the path of rotation reamers, and means to spread and align said fruit holders with said reamers after the fruit is cut, of a drive shaft, an eccentric on the drive shaft, a support forming said carrier and being supported on the eccentric, a releasable catch to connect said support to said eccentric for rotation as a unit, tripping means to disengage said catch when the support is in a position to hold said holders opposite said reamers so as to permit reciprocation of said support by said eccentric, and means to hold said support against rotation during said reciprocation.

5. In a fruit juice extractor, the combination with a knife and the reamers, of separable holders facing toward each other substantially parallel to the axis of a circular path for engaging the fruit, a carrier for carrying said holders on said circular path, means to hold said holders in fruit engaging position during their travel with the fruit past the knife for cutting the fruit, means to move said holders apart and from the position parallel to the axis of said circular path to a position substantially vertical to such axis so as to face each separated holder toward one of said reamers, and means to reciprocate said holders in said vertical directions so as to engage said cut fruit with said reamers and to return said holders away from said reamers.

6. In a fruit juice extractor, the combination with a knife and reamers; of a pair of separable holders adapted to engage opposite sides of the fruit, a carrier for said holders, means of connection between said carrier and the holders to allow change of position of said holders relatively to each other, means to impart movement to said carrier on a substantially circular path so as to carry the holders and the fruit past the knife for cutting the fruit, means to convert said moving force into reciprocating movement radially to said circular path and toward and away from said reamers after said cutting, means to control the position of said holders so as to hold said holders spaced apart substantially parallel to the axis of the circular path and one holder on each side of the circular path but in gripping position to allow passage of the gripped fruit past the knife, means to turn the sections of the holders and the cut fruit therein from the position substantially parallel to the axis of the circular path to a position substantially vertical to such axis and to hold said turned sections of said holders aligned with said reamers during the said reciprocating movement and means to move said holders into gripping position over a fruit after said holders are carried away from said reamers.

7. In a fruit juice extractor, the combination with a knife and reamers; of a pair of opposed cup-like holders, means to carry said cups on a substantially circular path from a loading position past said knife and to said reamers and back to the loading position, means to control the position of said cups during a cycle of operation so as to grip the fruit and have the space between the cups aligned with the knife during the cutting in a position with the mouths of the cups substantially facing the plane of said circular path, and means to separate and turn the cups from said initial position to a position substantially vertical to the axis of said circular path and toward the reamers during reaming, and means to return the cups toward said position facing said circular path and toward each other so as to engage another fruit at the initial or loading position.

8. In a fruit juice extractor, the combination with a knife and reamers; of a pair of opposed cup-like holders, means to carry said cups on a substantially circular path from a loading position past said knife and to said reamers and back to the loading position, means to control the position of said cups during a cycle of operation so as to grip the fruit and have the space between the cups aligned with the knife during the cutting, to separate and turn the cups substantially at right angles to face in the same direction and toward the reamers during reaming and to return the cups to face each other so as to engage another fruit at the initial or loading position, said carrying means including a frame, means to adjustably connect said cups to the frame so as to hold the cups in a position facing substantially parallel with the axis of said circular path until the cups approach the reamers, means to turn and hold the cups facing substantially at right angles to such axis when approaching said reamers, a rotating drive element, releasable means to connect said frame to said drive element for rotation therewith until the cups reach a position substantially opposite to the reamers, and means actuated at the reamer position of the cups to temporarily release said connecting means and to convert the rotating movement of said drive element into a reciprocating movement of the frame and of the cups substantially at right angles to the axis of said circular path toward and away from said reamers.

9. In a fruit juice extractor, the combination with a knife and reamers; of a pair of opposed cup-like holders, means to carry said cups from a loading position past said knife and to said reamers and back to the loading position, means to control the position of said cups during a cycle of operation so as to grip the fruit and have the space between the cups aligned with the knife during the cutting, to separate and turn the cups apart and to face them so as to hold said cups facing toward each other substantially parallel with the plane of their movements from the loading to about the reaming positions, and to hold said cups facing substantially at right angles to the plane of said movement and toward the reamers during reaming and to return the cups toward each other so as to engage another fruit at the initial or loading position, said carrying means including a frame, means to adjustably connect said cups to the frame, a rotating drive element, releasable means to connect said frame to said drive element for rotation therewith until the cups reach a position substantially opposite to the reamers, and means actuated at the reamer position of the cups to temporarily release said connecting means and to convert the rotating movement of said drive element into a reciprocating movement of the frame and of the cups toward and away from said reamers substantially at right angles to the axis of rotation of said frame, and means between the reaming position and loading position of the path of cups for ejecting the rind of the fruit from the cups.

10. In a fruit juice extracting device, the combination with a loading means, a cutting blade arranged in the path of movement of the fruit, and reamer means arranged axially offset from the circumference of the path of the fruit in said device, of a carrier mechanism comprising a rotating drive element, a member movable on the rotating drive element, means of connection between said rotating drive element and said movable member to convert the rotation of said element into reciprocating motion of the movable member, means to interlock said movable member and said means of connection for rotation as a unit, adjustable holding means on said movable member for carrying the fruit to be cut from said loading means to the cutting blade and reamer means, means to turn said holding means toward the axially offset reamer means when said holding means is approaching the position of said reamer means, and means to temporarily release said movable member for said reciprocating movement when said holding means is aligned with said reamer means.

11. In a fruit juice extracting device, the combination with a loading means, a cutting blade, and reamer means arranged substantially circumferentially of the device, of a carrier mechanism comprising a rotating drive element, a member movable on the rotating drive element, means of connection between said rotating drive element and said movable member to convert the rotation of said element into reciprocating motion of the movable member, releasable means to interlock said movable member and said means of connection for rotation as a unit, adjustable holding means on said movable member for carrying the fruit to be cut from said loading means to the cutting blade and reamer means, and means to temporarily release said movable member for said reciprocating movement when said holding means is aligned with said reamer means, said holding means comprising a pair of spaced cup-like holders, yieldable connection between each holder and the movable carrier member normally urging the opposed holders apart from each other to face radially from the frame, and means engaged by said holders to regulate the relative positions of said holders so as to align them with said loading means, said cutting blade, and said reamer in predetermined spaced positions.

12. In a fruit extracting device of the character described, having loading means, cutting means, and juice extracting means, a fruit carrying mechanism comprising, a pair of opposed holders, a carrier for the holders, means to rotate said carrier, means to adjustably support the holders on said carrier, resilient means to urge the holders apart from each other to positions facing substantially radially with respect to the plane of rotation of the carrier, and guide means to adjust the positions of the holders relatively to each other as they are carried around by the carrier so as to align said holders to face each other and the fruit in operative relation to said loading means, and in spaced opposed relation at said cutting means and to face substantially radially at said juice extracting means, and means to convert said rotating movement of the carrier to reciprocating movement during the extraction operation at said juice extracting means.

13. In a fruit juice extracting device having a rotating carrier to carry the fruit around successively to a cutting blade and to extracting means, adjustable fruit holders comprising, a pair of opposed cup-like members, means to pivotally connect said members to said carrier so that said members are movable apart from each other from a position substantially parallel to the axis of rotation of said carrier to a position substantially at right angles to such axis, guides along the path of movement of the holders to regulate the relative positions of the respective opposed cup-like members so that said members are clamped on the fruit through the cutting operation and the members are apart and at said right angle position opposite said extracting means, and thereafter are positioned to receive a fruit therein while brought back into said parallel clamping position.

14. In a fruit juice extracting device having a rotating carrier to carry the fruit around successively to a cutting blade and to extracting means, adjustable fruit holders comprising, a pair of opposed cup-like members, means to pivotally connect said members to said carrier so that said members are movable apart from each other from a position substantially parallel to the axis of rotation of said carrier to a position substantially at right angles to such axis, guides along the path of movement of the holders to regulate the relative positions of the opposed cup-like members so that said opposed cup-like members are clamped on the fruit through the the cutting operation substantially parallel with the axis of rotation of said carrier and the cup-like members are apart facing substantially at right angles to said axis of rotation opposite said extracting means, and are positioned to receive a fruit therein while brought back into said parallel clamping position, and means to eject the parts of the fruit from said holders after the extracting operation and before the cup-like members are turned back to said parallel position.

GUSTAVE O. BROWN.
ALEXANDER VINOGRADOFF.